UNITED STATES PATENT OFFICE.

ALICE A. WRIGHT, OF OAKLAND, CALIFORNIA, ASSIGNOR TO THE RESILIA CORPORATION, OF SAN FRANCISCO, CALIFORNIA, A CORPORATION OF CALIFORNIA.

COMPOSITION FOR AND PROCESS OF REVIVIFYING AND PRESERVING RUBBER.

1,114,841. Specification of Letters Patent. Patented Oct. 27, 1914.

No Drawing. Application filed April 15, 1914. Serial No. 832,092.

*To all whom it may concern:*

Be it known that I, ALICE A. WRIGHT, a citizen of the United States, residing at Oakland, in the county of Alameda, State of California, have invented a new and useful Composition for and Process of Revivifying and Preserving Rubber, of which the following is a specification in such full and clear terms as will enable those skilled in the art to construct and use the same.

My invention relates to the treatment of rubber articles or rubber coated articles and has for its main object the restoration of the resiliency of the rubber and of the frictional adherence or contact of its surface with other substances and also the preservation of the rubber.

It is well known that rubber products are subject to hardening and deterioration in resilient properties due to the inherent qualities of the rubber and to the atmospheric conditions. For these reasons rubber coated articles, such as the platens of typewriters and similar machines become hard and unyielding rendering them unfit for use. Moreover, when they lose their resiliency the outer surface becomes compact, hard and smooth, causing it to lose its yielding frictional adherence or gripping contact which is essential to enable the platen roll to properly feed the paper through the machine.

My invention not only revivifies the rubber, restoring its pliant qualities but it also renews the frictional gripping surface.

My process of revivifying rubber surfaces consists in subjecting the surface to the action of a volatile solvent carrying in solution a gummy material and admixed with a powdered abradant. The volatile solvent which is preferably alcohol is quickly absorbed by the pores of the rubber, which probably softens the rubber particles in the outer layers at least and causes them to expand or swell. The alcohol serves as a carrier for the gummy material which is preferably camphor gum and as the alcohol evaporates the suspended and dissolved ingredients are deposited in the softened exterior.

The composition which I employ in this revivifying process preferably consists of twelve ounces of camphor gum dissolved in a gallon of alcohol to which is added four ounces of a powdered abradant such as pumice stone. I have found in actual practice that the specified proportions give excellent results but these proportions may be varied considerably with a fair measure of success. The alcohol serves as the solvent and carrier for the camphor and also as a softening medium for the rubber surface to which it is applied, causing it to swell and become pliant. The camphor gum probably acts as a binder for the powdered abradant and also coöperates therewith in filling the expanded pores of the rubber. Furthermore the camphor and powdered abradant which fill the surface pores cause the surface to present a frictional contact or adherence to articles, such as sheets of paper, with which it comes in contact. For this reason my composition is adapted to the revivification of discarded platen rolls of typewriters which have become hard and unyielding and which are filled with minute holes or pitmarked by the constant striking of the keys. In such cases the holes are filled by the combined camphor and powdered ingredient thereby restoring the surface to its original unbroken, even character, and imparting a surface which effectually grips the paper and prevents any slipping.

The preparation may be applied to the rubber surface with a cloth or sponge and may be repeated several times if the platen roll is in very poor condition. Platens can be maintained in proper resilient condition with a frictional contact or gripping surface by the occasional application of my composition, thereby prolonging the life of the rubber.

I claim:

1. The process of revivifying rubber surfaces which comprises subjecting said surfaces to the action of an alcoholic solution of camphor and a powdered abradant.

2. The process of revivifying rubber surfaces which comprises subjecting said surfaces to the action of a volatile solution of a camphor-like material admixed with a pulverulent mineral material.

3. A compound adapted to restore the resiliency and frictional adherence of rubber surfaces when applied thereto, comprising alcohol containing in solution camphor admixed with a powdered abradant.

4. A compound for application to rubber surfaces to restore its resiliency and pliant character and for producing a frictional contact surface comprising substantially twelve ounces of camphor gum dissolved in a gallon of alcohol to which is added four ounces of pulverized pumice.

5. A compound for application to rubber surfaces to restore its resiliency and pliant character and for producing a frictional contact surface comprising a solution of a camphor dissolved in a volatile solvent admixed with a pulverulent mineral substance.

In testimony whereof I have hereunto set my hand this tenth day of April, A. D. 1914, in the presence of the two subscribed witnesses.

ALICE A. WRIGHT.

Witnesses:
   CARLOS P. GRIFFIN,
   JULIUS CALMANN.